United States Patent [19]

Morita

[11] Patent Number: 4,507,972
[45] Date of Patent: Apr. 2, 1985

[54] PRESSURE GAUGE

[75] Inventor: Saichiro Morita, Tokyo, Japan

[73] Assignee: Yokogawa Hokushin Electric Corporation, Tokyo, Japan

[21] Appl. No.: 283,699

[22] Filed: Jul. 15, 1981

[30] Foreign Application Priority Data

Aug. 5, 1980 [JP] Japan ................. 55-106725

[51] Int. Cl.³ .............. G01L 19/04; G01L 9/12
[52] U.S. Cl. .................. 73/708; 73/706; 73/718; 73/722; 73/725; 92/1
[58] Field of Search ........... 73/708, 706, 718, 724, 73/717, 719, 720, 721, 722; 92/1, 6 D, 6 R, 59, 104, 105

[56] References Cited

U.S. PATENT DOCUMENTS 3,894,436 7/1975 Jurovsky ................. 92/1
3,895,524 7/1975 Jurovsky ................. 92/1

FOREIGN PATENT DOCUMENTS 409148 12/1975 Fed. Rep. of Germany ....... 73/715
236817 11/1969 U.S.S.R. ................. 73/715

Primary Examiner—Donald O. Woodiel
Attorney, Agent, or Firm—Pollock, Vande Sande and Priddy

[57] ABSTRACT

A pressure receiving element for receiving an external pressure is attached to one end of a body and a temperature compensating diaphragm is attached to the other end of the body. A coupling shaft disposed in the body is fixed at both ends to the pressure receiving element and the diaphragm, respectively. A liquid is sealed in the body and means is provided for detecting displacement or force applied to the coupling shaft in accordance with a pressure received by the pressure receiving element. The diaphragm has corrugations of concentric circles and the crests of a plurality of them are made flat and one of the flat crests is fixed to the body. The effective area of the diaphragm inside of the flat crest that is fixed to the body is selected substantially to be equal to the effective area of the pressure receiving element.

9 Claims, 11 Drawing Figures

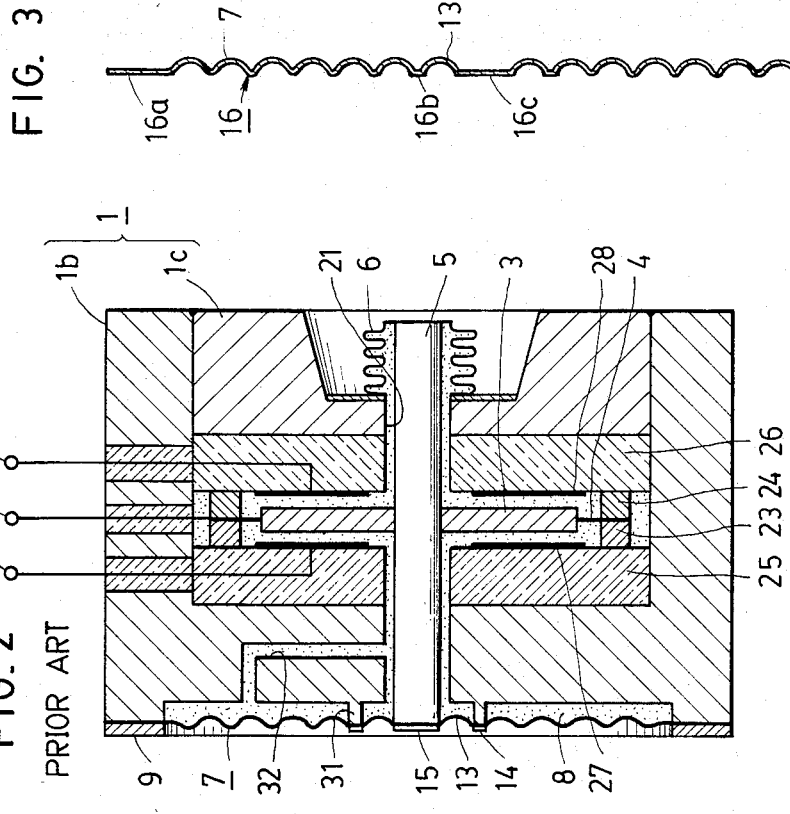

PRESSURE GAUGE

BACKGROUND OF THE INVENTION

The present invention relates to a pressure gauge of the type in which a pressure received by a pressure receiving element is transmitted as displacement or force to a coupling shaft disposed in a gauge body, and more particularly to a pressure gauge in which a liquid is sealed in the body and a temperature compensating diaphragm is provided for lessening the influence of a temperature change of the sealed liquid.

There has heretofore been employed a pressure gauge of the type that receives a pressure to be detected by a pressure receiving element, transmits the pressure as displacement or force of a coupling shaft coupled with the pressure receiving element in a gauge body and detects displacement or force of the coupling shaft by detecting means in the body, thereby to detect the pressure. For properly damping the response of the detecting means to pressure variations and for increasing the stability of the pressure detecting operation, a liquid is sealed in the detector body. Consequently, when ambient temperature or the temperature of a fluid the pressure of which is to be detected varies, the sealed liquid in the body expands or contracts to change the pressure of the sealed liquid, introducing an error in the pressure detection. A solution to this problem in the prior art is to attach a temperature compensating diaphragm to one end face of the gauge body. When the sealed liquid expands or contracts, the temperature compensating diaphragm is displaced correspondingly to cause a variation in the capacity in the gauge body, preventing the pressure of the sealed liquid in the gauge body from undergoing substantial changes.

With the use of such a temperature compensating diaphragm, when the pressure to be detected is high, a sufficient compensation is obtained but when the pressure is low, an error which cannot fully be compensated for by the temperature compensating diaphragm may become nonnegligible in some cases. In view of this, the central portion of the temperature compensating diaphragm is fixed annularly to the end face of the gauge body and the free end of the coupling shaft connected with the pressure receiving element is connected to the center of the annular portion so that the forces which are applied by the pressure of the sealed liquid to the central portion of the diaphragm and the pressure receiving element, respectively, due to a temperature change may equilibrate with each other through the coupling shaft. With such an arrangement, the influence of the pressure variation of the sealed liquid can be made negligibly small when the pressure to be detected is low.

In the pressure gauge, however, the effective area of the pressure receiving element, that is, the overall area of that portion of the pressure receiving element which acts to displace the coupling shaft by the pressure to be detected, is changed in accordance with the range of magnitude of the pressure to be detected. For example, a pressure receiving element of small effective area is employed for the detection of high pressures and a pressure receiving element of large effective area is used for the detection of low pressures. In order to eliminate the influence of the pressure of the sealed liquid to the pressure receiving element by connecting the coupling shaft to the temperature compensating diaphragm, it is necessary that the effective area of that portion of the temperature compensating diaphragm lying inside of the annular fixed portion be equal to the effective area of the pressure receiving element. Accordingly, the radius of the annular fixed portion of the temperature compensating diaphragm must be altered in accordance with the magnitude of the effective area of the pressure receiving element. The central portion of the diaphragm is fixed in a ring-like form to the gauge body, for example, by means of welding. In this case, in order to prevent a hole or holes from being made in the relatively thin diaphragm during welding, the central portion of the diaphragm is formed flat and the flat portion is welded to the gauge body. Accordingly, it is necessary to prepare a plurality of temperature compensating diaphragms respectively corresponding to pressure receiving elements of different effective areas.

SUMMARY OF THE INVENTION

It is an object of the present invention to provide a pressure gauge which permits sufficient temperature compensation using the same temperature compensating diaphragm in common to pressure receiving elements of different effective areas.

According to the present invention, the temperature compensating diaphragm has a central flat portion and corrugations of concentric circles surrounding the central flat portion and the crests of a plurality of of the concentric circle corrugations are formed flat. In accordance with the effective area of the pressure receiving element used, the flat portion of one of said plurality of concentric circle corrugations of the temperature compensating diaphragm is selected so that the pressure receiving portion of the diaphragm radially inward of the selected corrugation is substantially equal in effective area to the area of the pressure receiving element used, and the selected flat portion is fixed to the gauge body. In this way, the same temperature compensating diaphragm can be used in common to pressure receiving elements of different effective areas, that is, regardless of the range of pressure to be detected. Moreover, the end face of the gauge body on which the temperature compensating diaphragm is mounted is corrugated so that it may snugly conform to the diaphragm; namely, the crests of some of the corrugations of the end face of the body are made flat corresponding to those of the diaphragm. A selected one of the flat crest portions of the concentric circle corrugations of the diaphragm is fixed to the corresponding flat crest portion of the gauge body and consequently, the same gauge body can also be used regardless of the range of pressure to be detected.

BRIEF DESCRIPTION OF THE DRAWINGS

FIG. 1 is a sectional view showing an example of a conventional pressure gauge provided with a temperature compensating diaphragm;

FIG. 2 is a sectional view, similar to FIG. 1, showing another example of the conventional pressure gauge provided with a temperature compensating diaphragm;

FIG. 3 is a sectional view showing the temperature compensating diaphragm used in the pressure gauge of FIG. 2;

FIG. 4 is a sectional view illustrating an example of a temperature compensating diaphragm for use in the pressure gauge of the present invention;

DESCRIPTION OF THE PREFERRED EMBODIMENTS

Figure 5:
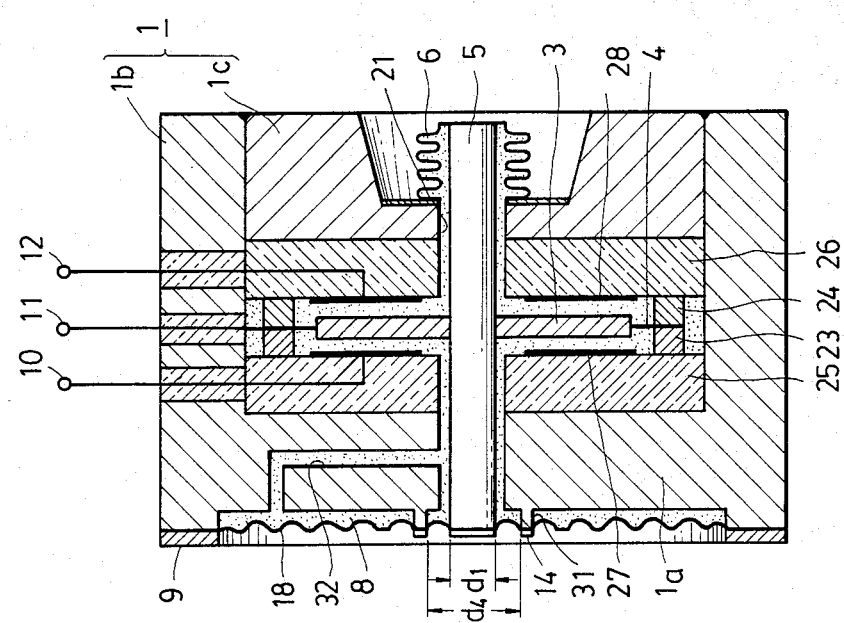
FIG. 5 is a sectional diagram illustrating an embodiment of the pressure gauge of the present invention as being applied to the detection of high pressures.

To facilitate a better understanding of the present invention, a description will be given first of prior art pressure gauges and their disadvantages. FIG. 1 illustrates a conventional pressure gauge. A tubular body 1 is formed by a short, cylindrical member 1b which has one end closed by an end plate 1a formed integrally therewith and has the other open end closed by an end plate 1c as by welding. A bellows 6 is attached as a pressure receiving element to one end of the body 1. The end plate 1c has a centrally disposed through hole 21 and the bellows 6 is fixed at one end, for example, by welding to the end plate 1c around the hole 21 in a manner to communicate with it. The bellows 6 isolates the interior of the body 1 from the outside and receives an external pressure to be detected.

Disposed opposite the other end of the body 1, that is, adjacent the exterior surface of the end plate 1a is a temperature compensating diaphragm 7 which has its marginal portion welded to the marginal portion of the end plate 1a together with a seal ring 9. The diaphragm 7 and the body 1 are spaced a little apart except at the welded portion. The end plate 1a has a through hole 22 made centrally thereof. The diaphragm 7 also isolates the inside of the body 1 from the outside and is readily displaced to permit variations in the capacity of the space defined by the diaphragm 7, the bellows 6 and the body 1. The diaphragm 7 has concentric corrugations 7a. A coupling shaft 5 is disposed in the body 1 to extend along its axis and coupled at one end with the moving end of the bellows 6. When the bellows 6 is is subjected to a pressure to be detected, the coupling shaft 5 is displaced in its lengthwise direction. FIG. 1 shows electrostatic capacitance type detecting means. Namely, a plate spring 4 is disposed in the body 1 centrally thereof to extend perpendicularly to its axis. The peripheral portion of the plate spring 4 is sandwiched between metal rings 23 and 24 and secured thereto. Between the rings 23 and 24 and the end plates 1a and 1c are interposed insulating plates 25 and 26 as of ceramics, and the insulating plates 25 and 26, the rings 23 and 24 and the plate spring 4 are fixed in the body 1. On the plate spring 4 is mounted a moving electrode 3, and fixed electrodes 27 and 28 are respectively provided as by evaporation of metal on the insulating plates 25 and 26 in opposing relation to the moving electrode 3. The plate spring 4 is electrically insulated from the body 1 and connected to a terminal 11, whereas the fixed electrodes 27 and 28 are also insulated from the body 1 and connected to terminals 10 and 12, respectively. The coupling shaft 5 is fixed to the center of the moving electrode 3 but electrically isolated therefrom, though not shown. The spring constant of the plate spring 4 is generally selected sufficiently larger than the spring constants of the bellows 6 and the diaphragm 7. The space defined by the body 1, the bellows 6 and the diaphragm 7 is filled with a liquid 8 such as silicon oil or the like.

With such an arrangement, when an atmospheric pressure, for example, is applied to the outside of the temperature compensating diaphragm 7 to impart to the bellows 6 a pressure P to be detected, the bellows 6 develops a force, $F=P \cdot A$, where A is the effective area of the bellows 6, that is, the largest cross-sectional area of the bellows 6 which creates a force that displaces the coupling shaft 5 by the pressure P in the bellows 6. Letting the combined spring constant of the plate spring 4 and the bellows 6 be represented by K, the plate spring 4 and the moving electrode 3 are displaced by $\Delta d = F/K$ by the force F generated in the bellows 6. For example, the moving electrode 3 approaches the fixed electrode 27 by $\Delta d$ and moves away from the fixed electrode 28 by $\Delta d$. This increases the electrostatic capacitance between the moving electrode 3 and the fixed electrode 27 and decreases the electrostatic capacitance between the moving electrode 3 and the fixed electrode 28. Such a differentially varying capacitance can be taken out as an electric signal across the terminal 11 and the terminals 10 and 12, that is, the pressure P can be obtained in the form of an electric signal.

When the temperature of the sealed liquid 8 varies under the influence of ambient temperature, the sealed liquid 8 expands or contracts correspondingly. In the case where the diaphragm 7 is a rigid body, the capacity V of the space defined by the body 1, the diaphragm 7 and the bellows 6 remains unchanged to inhibit variations in the volume of the sealed liquid 8, so that the pressure of the sealed liquid 8 varies to apply a biasing force to the bellows 6, resulting in inaccurate detection of the pressure P. Since the diaphragm 7 is pliable, however, it is displaced with expansion or contraction of the sealed liquid 8 to cause a change in the abovesaid capacity V. In this case, the pressure variation of the sealed liquid 8 is so small that an error in the detection of the pressure P is also negligibly small. In other words, the diaphragm 7 has a temperature compensating function that prevents an error resulting from temperature variations. However, when the pressure P to be detected is small, the pressure variation of the sealed liquid 8 by the temperature change cannot be neglected.

Letting that volume of the sealed liquid 8 which expands or contracts with a temperature change $\Delta t$ be represented by $\Delta V$ and the volume expansion coefficient of the sealed liquid 8 be represented by $\alpha$, $\Delta V = V \cdot \alpha \cdot \Delta t$. Letting the capacity changing constant which changes the capacity V by a displacement of the diaphragm 7 be represented by $\beta$, a pressure fluctuation $\Delta P$ of the sealed liquid 8 by the temperature change $\Delta t$ is as follows:

$$\Delta P = \frac{V \cdot \alpha \cdot \Delta t}{\beta}$$

A zero point variation $\epsilon_1$ (%) by the pressure fluctuation $\Delta P$ is given as follows:

$$\epsilon_1 = \frac{A \cdot \Delta P}{A \cdot P} \times 100 \, (\%) = \frac{V \cdot \alpha \cdot \Delta t}{P \cdot \beta} \times 100 \, (\%)$$

Accordingly, when the pressure P is large, the zero point variation $\epsilon_1$ is sufficiently small and negligible, whereas when the pressure P is small, the zero point variation $\epsilon_1$ is large and is not negligible.

To solve such a problem, there has been proposed a pressure gauge depicted in FIG. 2. In FIG. 2, the parts corresponding to those in FIG. 1 are identified by the same reference numerals. The central portion of the temperature compensating diaphragm 7 is fixed in a circular form to the end face of the body 1 and, at the same time, the center of the diaphragm 7 is fixed to the end face of the coupling shaft 5. To this end, the diaphragm 7 has a centrally disposed flat portion 16c and a ring-shaped flat portion 16b about it. The flat portions 16b and 16c are each formed at the top of one of the corrugations of the diaphragm 7. The peripheral portion of the diaphragm 7 is made flat as indicated by 16a and welded to the body 1 together with the seal ring 9 as in the case of FIG. 1. A ring-shaped projection 31 with a flat top surface is formed on the end face of the body 1 integrally therewith on the side of the diaphragm 7, as shown in FIG. 2. The ring-shaped flat portion 16b of the diaphragm 7 is welded to the projection 31 along with a seal ring 14 and the centrally disposed flat portion 16c is welded to the end face of the coupling shaft 5 along with a seal plate 15. The space defined by the diaphragm 7 and the body 1 on the outside of the ring-shaped flat portion communicates with the inside of the body 1 through a liquid path 32 formed in the end plate 1a.

The effective area of that portion 13 of the diaphragm 7 which lies inside of the flat portion 16b (which portion will hereinafter be referred to as the pressure receiving portion 13), that is, the overall area B of the portion where the sealed liquid 8 in the pressure receiving portion is given force to displace the coupling shaft 5 by pressure, and the effective area A of the bellows 6 are selected equal. When the displacement force applied to the coupling shaft 5 by the bellows 6 based on the pressure change $\Delta P$ of the sealed liquid 8 and the displacement force received by the pressure receiving portion 13 based on the pressure change $\Delta P$ are coincident with each other and reverse in direction, these forces are in equilibrium and no error results from the pressure variation $\Delta P$. The zero point variation $\epsilon_1$ by the bellows 6 based on the pressure fluctuation $\Delta P$ of the sealed liquid 8 is $$\frac{A \cdot \Delta P}{A \cdot P} \times 100 \, (\%),$$

as referred to previously. A zero point variation $\epsilon_2$ by the pressure receiving portion 13 similarly based on the pressure change $\Delta P$ is $$-\frac{B \cdot \Delta P}{A \cdot P} \times 100 \, (\%).$$

Accordingly, a zero point variation $\epsilon_3$ of the detected output is as follows:

$$\epsilon_3 = \frac{A \cdot P - B \cdot \Delta P}{A \cdot P} \times 100 \, (\%) =$$

$$\frac{A - B}{A} \cdot \frac{V \cdot \alpha \cdot \Delta t}{P \cdot \beta'} \times 100 \, (\%)$$

where $\beta'$ is a capacity changing constant of the pressure receiving portion 13 and when B is small, $\beta' \approx \beta$. Consequently, if the effective areas A and B are equal, then the zero point variation $\epsilon_3$ is zero. These effective areas cannot always be made equal. Therefore, the zero point variation $\epsilon_3$ does not become zero but it is relatively easy to reduce the difference between the effective areas A and B, for example, to B=0.95A or so. In the case where B=0.95A, it follows that $$\frac{A - B}{A} = 0.05;$$

the zero point variation can be decreased as compared with the case of FIG. 1. By equilibrating the forces of the bellows 6 and the pressure receiving portion 13 which tend to displace the coupling shaft 5 as a result of the pressure change $\Delta P$ of the sealed liquid 8, as described above, the zero point variation can be reduced. Even if the abovesaid forces of the bellows 6 and the pressure receiving portion 13 do not cancel each other on account of the difference between the aforementioned effective areas, the remaining force is further decreased by the aforesaid temperature compensating action of the portion of the diaphragm 7 other than the pressure receiving portion 13. When $\beta' = \beta$, the zero point variation $\epsilon_3$ is given by the following expression:

$$\epsilon_3 = \frac{A - B}{A} \cdot \frac{V \cdot \alpha \cdot \Delta t}{P \cdot \beta} \times 100 \, (\%)$$

Accordingly, assuming, for example, that when $$\frac{A - B}{B} = 0.05,$$

the zero point variation $\epsilon_1$ of the pressure gauge depicted in FIG. 1 is 10 (%), while the zero point variation $\epsilon_3$ of the pressure gauge shown in FIG. 2 is as small as 0.5 (%). Accordingly, in the case of the same error, the pressure gauge of FIG. 2 is able to detect a smaller pressure P than the pressure gauge of FIG. 1.

Generally, when the pressure P to be detected is small, it is necessary to increase the effective area A of the pressure receiving element, i.e. the bellows 6 in this example so as to obtain a sufficient output. Therefore, in order to achieve the temperature compensation described above in respect of FIG. 2, the effective area of each of the bellows 6 and the pressure receiving portion 13 must be varied in accordance with the magnitude of the pressure P to be detected. The diaphragm 7 is required to be thin, flexible and readily displaceable so as to ensure excellent temperature compensation and, to meet the requirement, it is formed to have corrugations of concentric circles and the flat portion 16b for fixing its central portion in a circular form to the body 1. In practice, it is necessary to prepare a plurality of diaphragms having flat portions 16b of different radii and to select one of them in accordance with the magnitide of each particular pressure P to be detected; namely, a diaphragm having the pressure receiving portion 13 of the same effective area as that of the bellows used must be attached to the body 1. The preparation of several kinds of diaphragms having flat portions 16 of different radii increases the number of parts that are required, resulting in raised cost of the pressure gauge.

FIG. 4 illustrates an example of a temperature compensating diaphragm 18 for use with the pressure gauge of the present invention. The diaphragm 18 is made of the same material as the conventional diaphragm 7, for example, stainless steel and it is corrugated concentrically as is the case with the prior art diaphragm. The peripheral portion and the central portion of the diaphragm 18 are formed as flat portions 18a and 18c, respectively, in the same manner as in the prior art. The diaphragm 18 differs from the conventional one 7 in that the crests of a plurality of concentric circle corrugations surrounding the flat portion 18c are formed flat on the same side, as indicated by 18b in FIG. 4. The pitch of the concentric circle corrugations is selected to be identical with that of the conventional diaphragm.

The temperature compensating diaphragm shown in FIG. 4 can equally be used with a plurality of pressure gauges for measuring different pressures. FIG. 5 shows an embodiment of the present invention as being applied to a pressure gauge for detecting high pressures. The pressure gauge is substantially identical in construction with the pressure gauge depicted in FIG. 1, but the temperature compensating diaphragm 18 is disposed opposite the exterior surface of the end face 1a of the body 1 and welded thereto at the peripheral portion along with the seal ring 9. The diaphragm 18 is not fixed at the other portions to either the body 1 or the coupling shaft 5. In this case, since the pressure P to be detected is large, an error which is introduced by the zero point variation in the detected pressure P is sufficiently reduced only by the compensation for the pressure fluctuation $\Delta P$ of the sealed liquid 8 by displacement of the diaphragm 18.

Figure 6:
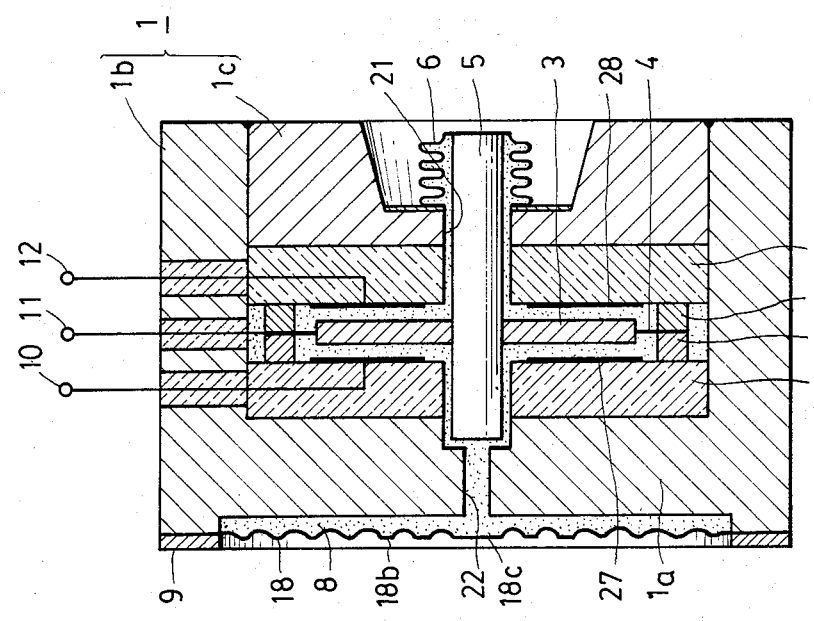
FIG. 6 is a sectional view illustrating another embodiment of the pressure gauge of the present invention as being applied to the detection of medium pressures.

FIG. 6 illustrates another embodiment of the present invention as being applied to a pressure gauge for detecting pressures lower than those detected by the pressure gauge of FIG. 5. The pressure gauge is substantially identical in construction with that of FIG. 5. The same temperature compensating diaphragm 18 as that employed in FIG. 5 is used in this case. The central flat portion 18c of the diaphragm 18 is welded to the coupling shaft 5 together with the seal plate 15, and the ring-shaped flat portion 18b of a minimum radius is welded to the projection 31 of the body 1 together with the seal ring 14. The portion encompassed by the ring-shaped flat portion 18b thus welded serves as the pressure receiving portion 13. The ring-shaped flat portion 18b to be welded is selected so that the effective area B of the pressure receiving portion 13 may be nearly equal to the effective area A of the bellows 6. Even if the coupling shaft 5 tends to be displaced by the bellows 6 in response to the pressure variation $\Delta P$ of the sealed liquid 8 resulting from a temperature change, the coupling shaft 5 tends to be displaced by the pressure receiving portion 13 based on the pressure variation $\Delta P$ in a direction to cancel the displacement of the coupling shaft 5 by the bellows 6, so that the zero point variation by the temperature change is sufficiently small. Further, the portion of the diaphragm 18 outside of the fixed flat portion 18b is also displaced by the expansion or contraction of the sealed liquid 8 to reduce the pressure fluctuation $\Delta P$, suppressing the zero point variation.

Figure 7:
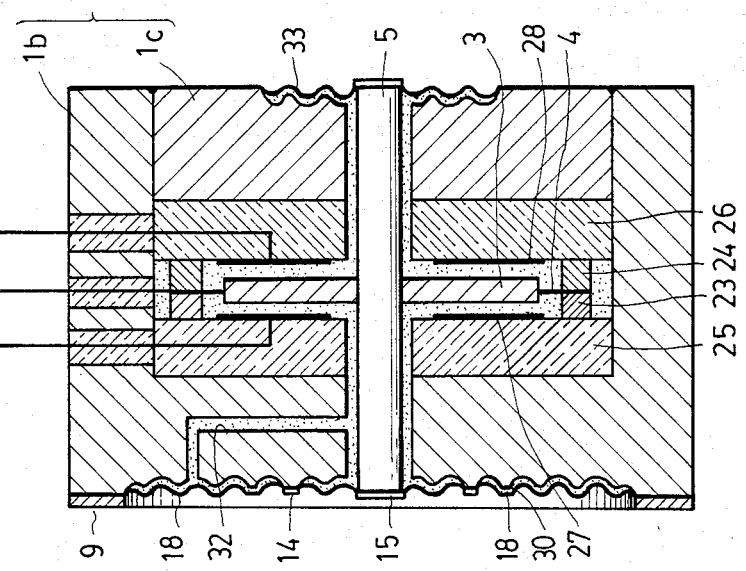
FIG. 7 is a sectional view illustrating another embodiment of the present invention as being applied to the detection of low pressures.

FIG. 7 illustrates another embodiment of the present invention as being applied to a pressure gauge for detecting pressures lower than those detected by the gauge of FIG. 6. This embodiment differs from the embodiment of FIG. 6 in the following points; namely, the effective area A of the bellows 6 is larger than in FIG. 6 and a ring-shaped flat portion 18b of a larger radius is selected correspondingly and the effective area B of the pressure receiving portion is made substantially equal to the effective area A of the bellows 6 for detecting low pressures. Accordingly, sufficient temperature compensation can be achieved as is the case with the embodiment of FIG. 6.

As described above, according to the present invention, the same temperature compensating diaphragm 18 can equally be used with pressure gauges for detecting high, medium and low pressures, as depicted in FIGS. 5 to 7; in any case, sufficient temperature compensation can be achieved. In addition, since it is sufficient to prepare only one kind of temperature compensating diaphragm, the pressure gauge can be made inexpensive as a result.

For example, in the temperature compensating diaphragm 18 shown in FIG. 4, the diameter $d_1$ of the central flat portion 18c is 4 mm, the corrugation has a semicircular cross section with its diameter $d_2=2$ mm and the width $d_3$ of each ring-shaped flat portion 18b is 1 mm. In the case of using bellows 6 having an effective area of 0.2 cm$^2$, the ring-shaped flat portion 18b immediately inside of the central flat portion 18c is fixed to the body 1, as depicted in FIG. 6. In this case, the equivalent radius of the pressure receiving portion 13 is $$d_0 = \frac{d_1 + d_4}{2} = \frac{6 + 4}{2} = 5 \text{ (mm)}$$

and the effective area of the pressure receiving portion 13 is $$\frac{\pi \cdot d_0^2}{4} \text{ cm}^2 = \frac{3.14 \times 0.25}{4} \text{ cm}^2 = 0.196 \text{ cm}^2$$

Accordingly, the difference between the above effective area and the effective area, 0.2 cm$^2$, of the bellows 6 is as small as $0.2 - 0.196 = 0.004$ (cm$^2$)

In the case of using bellows 6 having an effective area of 0.5 cm$^2$, the ring-shaped flat portion 18b second from the central flat portion 18c is secured to the body 1, as depicted in FIG. 7. In this case, the equivalent radius of the pressure receiving portion 13 is $$d_0 = \frac{12 + 4}{2} = 8 \text{ (mm)}$$

and the effective area of the pressure receiving portion 13 is $$\frac{3.14 \times 0.64}{4} = 0.502 \text{ (cm}^2\text{)}.$$

Accordingly, the difference between this effective area and that of the bellows 6 is also as small as $0.5 - 0.502 = -0.002$ cm$^2$. In this way, the effective areas of the bellows 6 and the pressure receiving portion 13 can be made substantially equal by selecting the ring-shaped flat portion 18b to be fixed to the body 1 in accordance with the effective area of the bellows 6 used.

Figure 8:
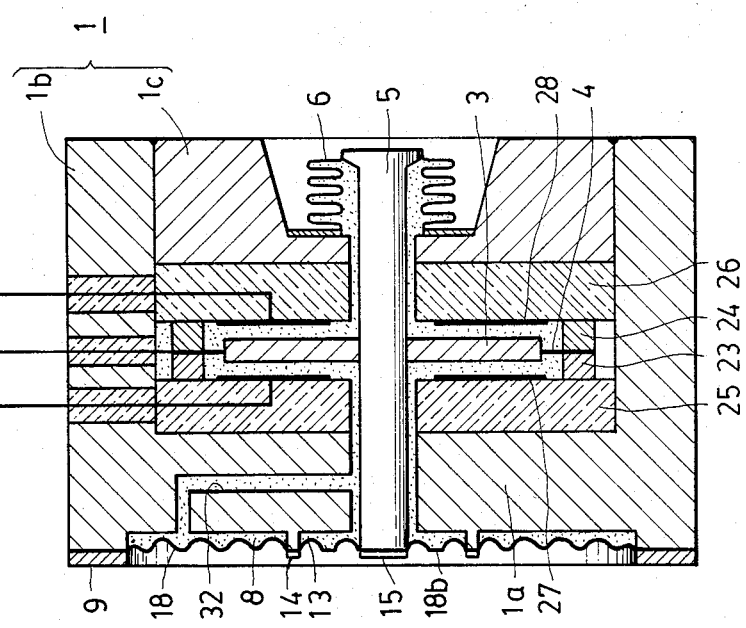
FIG. 8 is a sectional view showing a modified form of the pressure gauge of the present invention.

In the embodiments of FIGS. 6 and 7 the ring-shaped projection 31 is formed integrally with the body 1 for fixing thereto the ring-shaped flat portion 18b but this requires the preparation of several kinds of bodies 1. To avoid this, corrugations and flat portions corresponding to those of the temperature compensating diaphragm are formed in the end face 32 of the body 1 on the side of the diaphragm 18 so that the end face 30 of the body 1 may snugly conform to the diaphragm 18, as shown in FIG. 8, and a selected one of the ring-shaped flat portions 18b of the diaphragm 18 is fixed to the corresponding flat portion of the end face 30 in accordance with the effective area of the bellows 6 used. In this way, the body 1 can also be used with high-pressure, medium-pressure and low-pressure detectors in common to them. In addition, the capacity of the space between the body 1 and the diaphragm 18 can be reduced and the amount of the liquid 18 sealed can be decreased.

The pressure receiving element need not always be limited specifically to the bellows 6 but may also be a diaphragm 33, as depicted in FIG. 8. Although in the foregoing the present invention has been described in connection with the case where the atmospheric pressure is provided outside of the temperature compensating diaphragm 18, the invention is also applicable to the case where a vacuum pressure is applied to the pressure receiving portion 13. Also it is possible to adopt such an arrangement that applies an arbitrary pressure to the pressure receiving portion 13 and detects the difference between it and a pressure imparted to the pressure receiving element 6; namely, the pressure gauge of the present invention can be employed as a differential pressure gauge, too.

Figure 9:
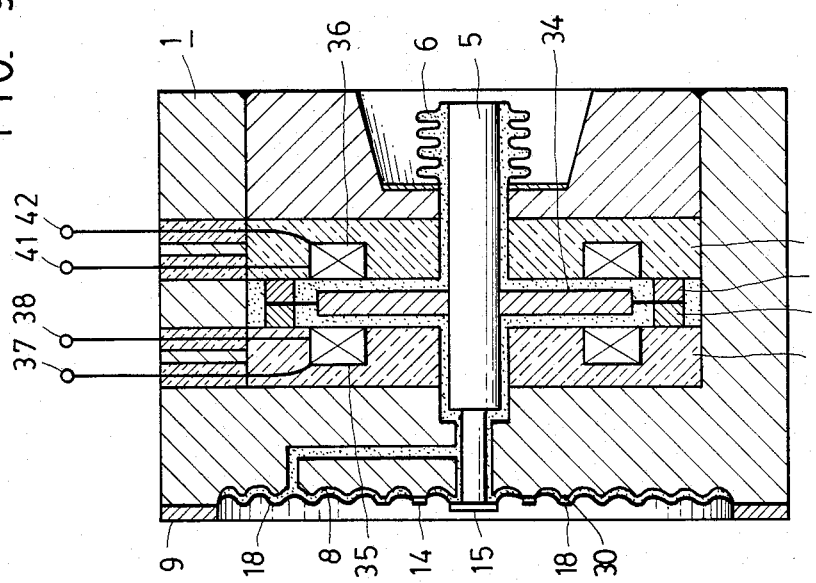
FIG. 9 is a sectional view showing another embodiment of the pressure gauge of the present invention as being applied to an inductance system.

The displacement of the coupling shaft 5 can be taken out as an electric signal not only by the electrostatic capacitance type means but also by inductance type means such as shown in FIG. 9. In FIG. 9 the parts corresponding to those in FIG. 6 are identified by the same reference numerals. A magnetic disc 34 as of ferrite is mounted on the plate spring 4 in place of the moving electrode 3 and, instead of the fixed electrodes 27 and 28, coils 35 and 36 differentially vary in response to the displacement of the coupling shaft 5 and the inductances can be taken out as electric signals via terminals 37 and 38 and terminals 41 and 42 connected across the coils 35 and 36, respectively.

Figure 10:
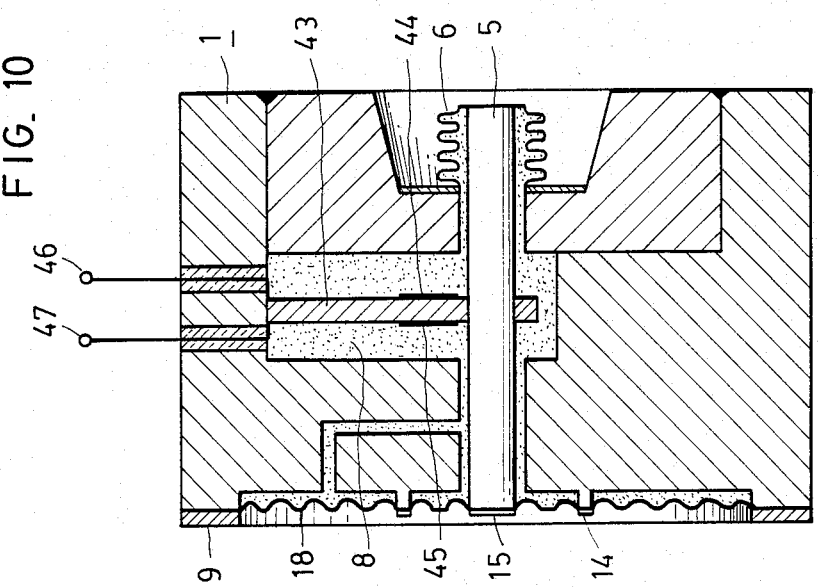
FIG. 10 is a sectional view showing another embodiment of the present invention as being applied to a strain gauge system.

FIG. 10 illustrates another embodiment of the present invention as being applied to a strain gauge type pressure gauge. In the body 1 is provided a beam 43 fixed at one end and a coupling shaft 5 is linked with the free end portion of the beam 43 substantially at right angles thereto. A strain is applied to the beam 43 in accordance with the displacement of the coupling shaft 5 and the strain is differentially provided by strain gauges 44 and 45 fixed to the beam 43 and electrically detected via terminals 46 and 47.

Figure 11:
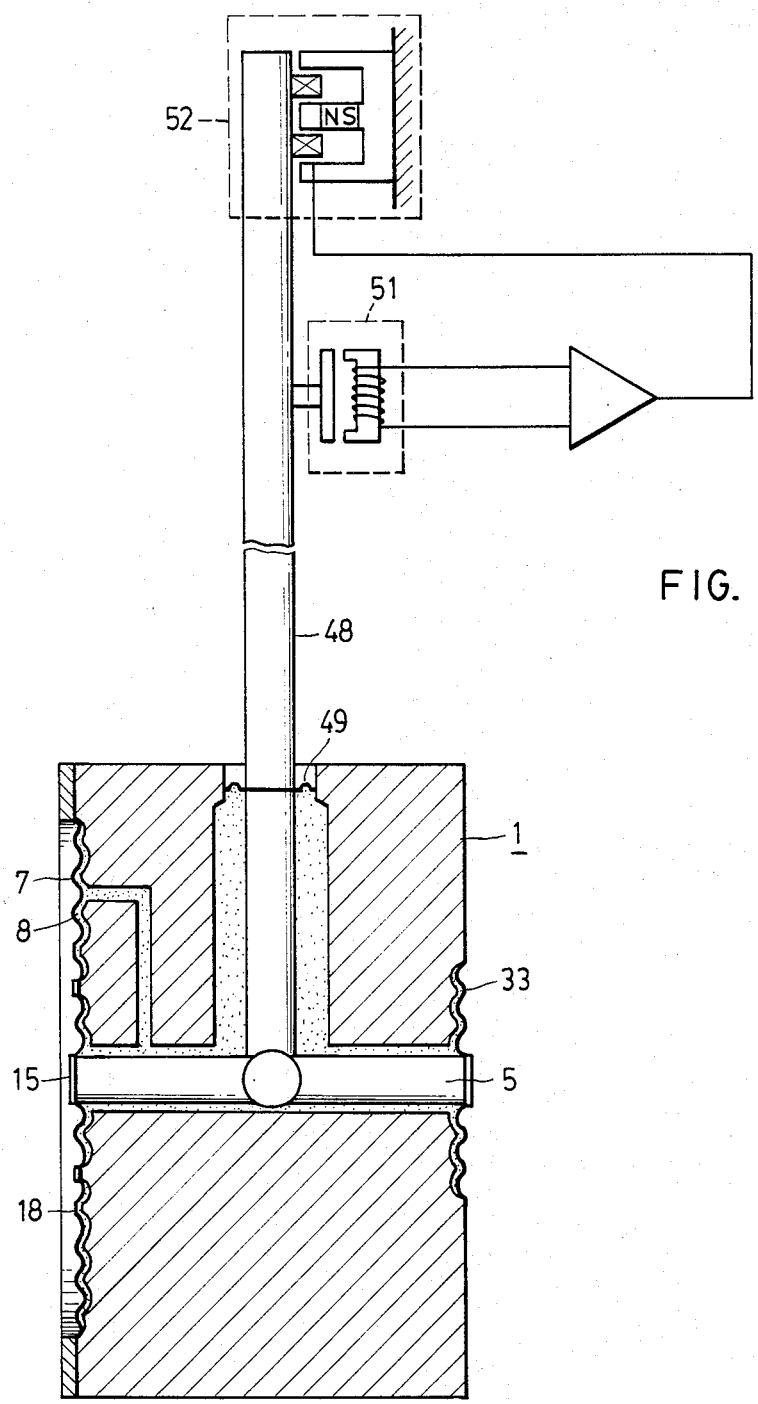
FIG. 11 is a sectional view showing another embodiment of the present invention as being applied to a force balance system.

FIG. 11 illustrates another embodiment of the present invention as being applied to a force balance type pressure gauge. A force beam 48 is provided to extend through the body 1 and its inner end is coupled with the coupling shaft 5 substantially perpendicularly thereto. By the displacement of the coupling shaft 5 or a force applied thereto, the force beam 48 is given a torque about a seal film 49 and the torque is detected by detecting means 51 provided outside of the body 1. The output from the detecting means 51 is supplied to a force motor to apply to the force beam 48 a force which equilibrates with the abovesaid force.

It will be apparent that many modifications and variations may be effected without departing from the scope of the novel concepts of this invention.

I claim:

1. A pressure gauge comprising:
   a tubular body;
   a pressure receiving element attached to one end of said body for isolating the interior thereof from the outside and for receiving an external pressure;
   an end plate covering the other end of said tubular body, said end plate having a through hole formed centrally therein, and said end plate also having an outwardly protruding flat-topped circular ridge formed on the outer surface thereof concentrically with said through hole;
   a temperature compensating diaphragm for isolating the interior of said tubular body from the outside, said diaphragm having a marginal portion which is welded to the other end of said body such that the region of said diaphragm radially inward of said marginal portion is spaced from the outer surface of said end plate, said diaphragm having a central flat portion surrounded by a plurality of concentric circle corrugations, the crests of a plurality of said concentric circle corrugations being formed flat, only one of said plurality of flat crests being welded to the flat top of said circular ridge of said end plate thereby to fix the position of said one flat crest relative to the outer surface of said end plates, and the others of said flat crests being free to move relative to said outer surface of said end plate;
   a coupling shaft disposed in said body and extending through said through hole, one end of said shaft being coupled to said pressure receiving element and the other end of said shaft being affixed to said central flat portion of said diaphragm;
   detecting means coupled to said shaft for providing a signal in response to the displacement of or a force received by said coupling shaft; and
   a liquid sealed in said tubular body.

2. A pressure gauge according to claim 1 wherein the fixed one of said flat crests is selected so that the area of that portion of the diaphragm inside the fixed crest which acts to shift the coupling shaft by the pressure of the sealed liquid is substantially equal to the effective area of the pressure receiving element.

3. The pressure gauge of claim 1 wherein said end plate has a plurality of said outwardly protruding flat-topped circular ridges formed on the outer surface thereof in concentric relation to one another and to said through hole, said plurality of flat-topped circular ridges being disposed in opposing relation respectively to said plurality of flat crested corrugations, a selected one only of said flat-topped ridges being welded to a selected one only of said flat crested corrugations, the area of that portion of the diaphragm which is radially inward of said selected flat-topped ridge being substantially equal to the effective area of said pressure receiving element.

4. A pressure gauge according to claim 1 wherein the pressure receiving element is a bellows.

5. A pressure gauge according to claim 1 wherein the pressure receiving element is a diaphragm.

6. A pressure gauge according to claim 1 wherein the detecting means is of the electrostatic capacitance type in which an electrostatic capacitance is varied in accordance with displacement of the coupling shaft.

7. A pressure gauge according to claim 1 wherein the detecting means is of the inductance type in which an inductance is varied in accordance with displacement of the coupling shaft.

8. A pressure gauge according to claim 1 wherein the detecting means is of the strain gauge type in which a resistance value varies with a strain which occurs in accordance with displacement or force of the coupling shaft.

9. A pressure gauge according to claim 1 wherein the detecting means is of the force balance type which generates a force equilibrating with the force applied to the coupling shaft.

* * * * *